United States Patent Office 3,819,812
Patented June 25, 1974

3,819,812
PROCESS FOR THE RECOVERY OF $NH_3$, $SO_2$, VOLATILE ORGANIC ACIDS AND FURFURAL FROM CONCENTRATED WASTE LIQUOR
Matti Toivonen, Aanekoski, Jyrki Kettunen, Kirkniemi, and Eero Salunen, Kuopio, Finland, assignors to Savon Sellu Oy, Kuopio, Finland
Filed Apr. 12, 1971, Ser. No. 133,075
Claims priority, application Finland, Apr. 17, 1970, 915/70
Int. Cl. C01c 1/08; C01b 17/48; C07c 51/02
U.S. Cl. 423—358          8 Claims

ABSTRACT OF THE DISCLOSURE

Ammonia, furfural, sulphur dioxide and volatile organic acids such as acetic and formic acids are recovered from ammonia based sulphite waste liquor by volatilizing them, drying the liquor to a powder, and separating them from the volatilized gases.

BACKGROUND OF THE INVENTION

Field of the Invention

The invention relates to a process and apparatus for the recovery of furfural, sulphur dioxide, ammonia, and volatile organic acids from concentrated waste liquor and particularly to a process and apparatus for the recovery of furfural, sulphur dioxide, ammonia, formic acid, and acetic acid from the so-called strong liquor formed in the sulphite or the semi-pulping process and the evaporation of coniferous or deciduous wood.

Description of the Prior Art

In the technical pulping process a considerable part of the components of the wood is dissolved in the cooking liquid, forming waste liquor, which is usually recovered from the washing of pulp and concentrated by evaporation for a later burning. Burning of waste liquid means, however, that all the organic components of the waste liquor are lost and that only the ashes, which contain the cooking alkali, and the sulphur dioxide from the smoke gases can be recovered. The ashes and the sulphur dioxide can then be reused for the preparation of the cooking liquid. As can be seen from the following table, the organic components form the major part of the dry matter of the waste liquor.

The compositions of the dry matter of the waste liquor after sulphite cooking:

|  | Coniferous wood | Deciduous wood |
|---|---|---|
| Lignosulphonates | 55 | 55 |
| Hexoses | 14 | 4 |
| Pentoses | 6 | 16 |
| Saccharic acids, etc. | 12 | 12 |
| Resins, etc. | 3 | 3 |
| Ashes (inorganic) | 10 | 10 |
| Total | 100 | 100 |

In processes not containing a recovery of the cooking chemicals, the concentrated waste liquor is usually destroyed by burning or it is dried further and marketed as a waste-liquor powder. Without burning the waste liquor, the formic acid and the acetic acid can be recovered by known leaching processes (e.g. Sonoco). The sulphur dioxide and the furfural can be removed by, for example, the known stripping processes. If ammonia has been used as the cooking alkali, the ammonia can be recovered by, for example, releasing it from its salts with a stronger alkali and by stripping the released ammonia with, for example, steam. Ion exchange and dialytical processes have also been experimented for the recovery of ammonia. A pyrolysis of diluted or concentrated liquor can likewise be used for the recovery of ammonia.

The object of this invention is to create a process and an apparatus for the utilization of all the components of the waste liquor in a way more effective and economic than burning.

SUMMARY OF THE INVENTION

According to the invention there is provided a process wherein the chemicals are made volatile, then the waste liquor is dried to a powder and the volatile compounds are removed and the volatile organic gases are separated from the fluids produced in the drying of the waste liquor.

DESCRIPTION OF THE PREFERRED EMBODIMENTS

Figure 1:
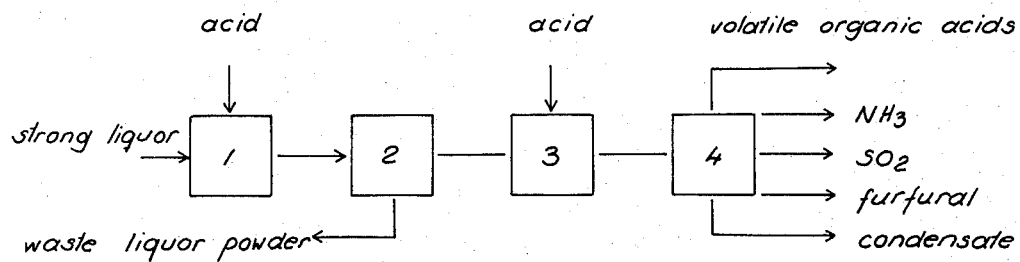
FIGS. 1–4 illustrate, schematically, some particularly advantageous apparatuses for the carrying out of the process according to the invention.

The waste liquor concentrate is conducted into an acidation and predistillation reactor 1, into which mineral acid is also conducted (FIG. 1). In addition to sulphuric acid, known as such, sulphur dioxide and phosphoric or nitric acid or different acid mixtures can be used as the mineral acid, the purpose of which is to release the simple fatty acids from their salts. The use of sulphur dioxide in the acidation is advantageous because it can be recovered for use as a cooking chemical later in the process. By using phosphoric and/or nitric acid for the acidation, a waste-liquor powder is obtained in the subsequent drying; this powder can be used advantageously for fodder or soil-improving agent. In the ammonium sulphite process, in particular, acidation is not necessarily required because of the ability of the organic acids to dissociate ammonia salts thermally, or the acidation can be carried out advantageously with the said acids or their mixtures. The acidated concentrate is conducted into the dryer 2, for which roller, vacuum, furnace, spray, or other dryers, which are known as such and the temperature of which can be controlled, are used. The components which do not evaporate at the drying temperature of the waste liquor are recovered from the dryer 2 in the form of waste-liquor powder. The heat released in the cooling of this powder is used most advantageously for the heating of the burning air of the burner of the dryer. The waste-liquor powder is used for fodder, soil-improving agent, lignin powder or, alternatively, for fuel. The waste gases obtained from the dryer 2, which, besides water-vapor, contain, among other things, the acetic acid, the formic acid, the furfural, the sulphur dioxide and the ammonia, are condensed in the condenser 3 by a known method. The released heat is used most advantageously for the preheating of the drying gases. The acetic acid, formic acid, furfural, sulphur dioxide, and ammonia are separated from each other in a separating device 4 which contains several unit operations of chemical technology, known as such. For example, the following method can be used. The furfural is separated from the liquor by a known process including distillation and evaporation operations. The acetic acid and the formic acid are separated from the liquor by leaching operations known as such (e.g. ethyl acetate or methyl-ethyl-ketone leaching) and separated from each other by azeotropic distillation known as such, and purified by known methods. Either the sulphur dioxide is stripped from the liquor by methods known as such and returned advantageously to the preparation of the cooking liquid, or the liquor as such with its sulphur dioxide and ammonia is returned to the preparation of the cooking liquid. The said unit operations can be carried out in another order or be replaced by other known unit operations; condensing 3 is not necessary in all cases.

Figure 2:
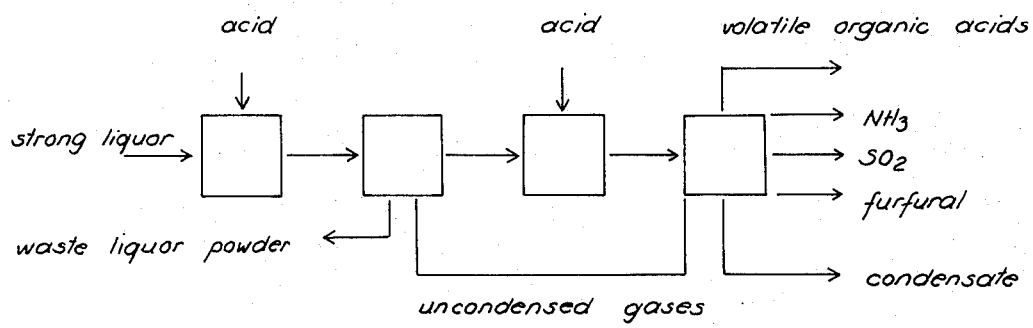
Figure 3:
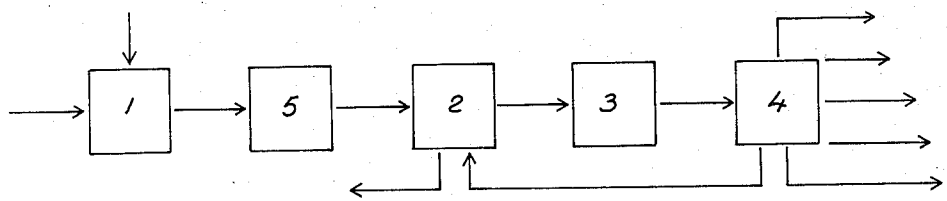

In the ammonium sulphite process, in particular, depending on the drying temperature, the $NH_4$ salts of organic and mineral acids and the $NH_4$ compounds in general can be made to dissociate thermally and thus move to the waste gas of the dryer without acidation. The releasing of the volatile acids is then promoted by the other acid components of the waste liquor. In this case the acetic acid and the formic acid can be released from their salts by acidating the waste gases of the dryer or their condensate with the said acids, particularly, with sulphur dioxide, which can be advantageously returned to the preparation of the cooking liquid. Especially the yield of furfural recovered in the process can be improved by conducting the waste liquor concentrate through a high-temperature reactor 5 into the dryer 2 (FIG. 3). The yield of the recovered furfural and the other chemicals referred to in this invention can be improved by reusing the waste gases of the dryer after the separation of the chemicals as drying gas in the dryer; in this case the quality of the waste-liquor powder is also improved since carbonization is prevented (FIGS. 2 and 3). The same result is obtained if an inert gas, such as nitrogen, is used as the drying gas in the dryer.

Figure 4:
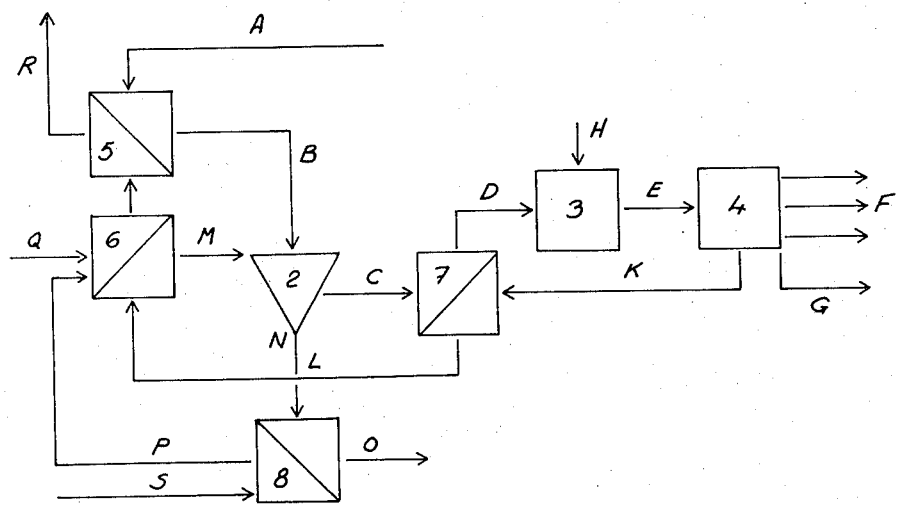

FIG. 4 shows a device with which, for example, the drying of ammonium sulphite waste liquor and the recovery of chemicals can be carried out advantageously by using a spray dryer as the dryer. This mode of practicing the process of this invention advantageously includes the step of preheating the waste liquor before drying it. Reference numbers 1-5 are the same as above, and the other numbers refer to the following units:

6 oil burner, indirect recovery of heat
5 preheating reactor, cooler of smoke gases
2 spray dryer
7 recovery of heat of drying gases into circulating gas
3 acidation reactor
4 recovery of volatile chemicals and condensation of water-vapor
8 cooling of waste-liquor powder and preheating of burning air
A pre-evaporated waste liquor
B preheated waste liquor
N hot waste-liquor powder
O cooled waste-liquor powder
S cooling air
P burning air
R smoke gases
M heated drying (circulating) gas
C waste gas of drying (water-vapor+chemicals)
D cooled waste gas of drying
H acidation acid, e.g. sulphur dioxide
E acidated waste gas
F volatile organic acids and furfural
G condensate and $SO_2$ and $NH_3$ [$(NH_4)_2SO_3$] for the preparation of cooking liquid
K uncondensed circulating gas
L preheated circulating gas
Q burning oil The process according to the invention is particularly advantageous in such sulphite processes as do not include a recovery of cooking chemicals, when the aim is to recover all the valuable components of the waste liquor. The most advantageous result economically is obtained in the process in which deciduous wood is cooked in a cooking liquid containing ammonia and sulphur dioxide.

EXAMPLE 1

When drying the waste liquor of an ammonium sulphite mill (raw material: birch) in a device according to FIG. 1 at the temperature of 110° C., the following distribution of the chemicals of the waste liquor was obtained:

|  | Waste liquor | Powder | Condensate |
|---|---|---|---|
| Water | 100 | 10 | 90 |
| Ammonia | 100 | 60 | 40 |
| Sulphur dioxide | 100 | 50 | 50 |
| Acetic acid | 100 | 60 | 40 |
| Sugars | 100 | 100 | 0 |

EXAMPLE 2

When the drying of waste liquor according to Example 1 was carried out by using acids, the following distribution of the chemicals of the waste liquor was obtained:

Sulphuric acid acidation:

|  | Waste liquor | Powder | Condensate |
|---|---|---|---|
| Water | 100 | 10 | 90 |
| Ammonia | 100 | 100 | 0 |
| Sulphur dioxide | 100 | 20 | 80 |
| Acetic acid | 100 | 60 | 40 |
| Sugars | 100 | 60 | ¹40 |

¹ Furfural.

Phosphoric acid acidation:

|  | Water liquid | Powder | Condensate |
|---|---|---|---|
| Water | 100 | 10 | 90 |
| Ammonia | 100 | 50 | 50 |
| Sulphur dioxide | 100 | 30 | 70 |
| Acetic acid | 100 | 10 | 90 |
| Sugars | 100 | 100 | 0 |

EXAMPLE 3

When the drying according to Example 1 was carried out at different temperatures, the following distributions of the chemicals of the waste liquid were obtained.

Phosphoric acid acidation:

|  | Temperature, °C. | Waste liquor | Powder | Condensate |
|---|---|---|---|---|
| Ammonia | 110 | 100 | 60 | 40 |
| Do | 150 | 100 | 50 | 50 |
| Do | 200 | 100 | 40 | 60 |
| Sulphur dioxide | 110 | 100 | 50 | 50 |
| Do | 150 | 100 | 40 | 60 |
| Do | 200 | 100 | 0 | 100 |
| Acetic acid | 110 | 100 | 60 | 40 |
| Do | 150 | 100 | 25 | 75 |
| Do | 200 | 100 | 5 | 95 |
| Sugars | 100 | 100 | 100 | 0 |
| Do | 150 | 100 | 65 | 35 |
| Do | 200 | 100 | 35 | 65 |

It can be seen from this example how the pentoses (sugars) become furfurals and move to the condensate of the drying gases when the drying temperature is raised. The dehydration of the pentoses into furfural is promoted by the strong lignosulphonic acids remaining in the powder.

EXAMPLE 4

When waste liquor was dried in a device according to FIG. 1 by using air as the drying gas and in a device according to FIG. 2 by using circulating waste gas of the drying process as the drying gas, the respective distributions of the chemicals into the condensates were the following:

Phosphoric acid acidation, temperature 120° C.:

| Percent | Drying gas | |
|---|---|---|
|  | Air | Circulating gas |
| Ammonia | 60 | 70 |
| Sulphur dioxide | 55 | 60 |
| Acetic acid | 60 | 70 |
| Sugar | 0 | 0 |

EXAMPLE 5

Depending on the materials and drying temperature used in the acidation, the waste-liquor powder is particularly suitable for various purposes, such as:

| Drying temperature, °C. | Acidation | Purpose |
|---|---|---|
| <130 | | Fodder. |
| <130 | $H_3PO_4$ | Fodedr, soil improving. |
| <130 | $HNO_3$ | Do. |
| >200 | | Dispersion, pigment for paint. |
| >200 | $H_2SO_4$ | Fuel. |
| 130-200 | | Glue matter. |
| 130-200 | $H_2SO_4$ | Do. |
| 130-200 | $H_3PO_4$ | Soil improving. |
| 130-200 | $HNO_3$ | Do. |

What is claimed is:

1. A process for manufacture and recovery of chemicals comprising ammonia, furfural, sulhpur dioxide, acetic acid, and formic acid, from concentrated ammonia based sulphite waste liquor, comprising volatilizing said chemicals and drying the waste liquor into a waste liquor concentrate at a temperature of from about 110° to 200° C., and separating said chemicals from the fluids produced in the drying of the waste liquor.

2. The process of claim 1 wherein an acid selected from the group consisting of phosphoric acid, nitric acid, sulphuric acid and sulphur dioxide is added to the waste liquor to convert any salt of an organic volatile acid into acid form.

3. The process of claim 1, wherein the drying is effected at a temperature high enough to evaporate ammonia and decompose any ammonium salt of the organic volatile acids into volatile form.

4. The process of claim 1, wherein the drying is effected at a temperature high enough to effect dehydration of the pentoses of the sulphite waste liquor into furfural.

5. The process of claim 1, wherein the non-condensed gases from the separation are recycled to the drying step to promote the recovery of the chemicals and improve the quality of the dried waste-liquor powder.

6. The process of claim 1, wherein the waste liquor is preheated before drying in order to promote the recovery of the chemicals.

7. The process of claim 1, wherein condensate from the separating step is used with the sulphur dioxide and cooking alkali in the condensate in the cooking of the pulp.

8. The process of claim 1, wherein condensate from the separating step is used in washing the pulp.

References Cited

UNITED STATES PATENTS

| 2,689,250 | 9/1954 | Natta | 260—347.9 |
| 1,838,109 | 12/1931 | Richter | 260—347.9 |
| 2,966,396 | 12/1960 | Eaton | 423—356 |

FOREIGN PATENTS

| 494,611 | 10/1938 | Great Britain | 260—347.9 |

OSCAR R. VERTIZ, Primary Examiner

H. S. MILLER, Assistant Examiner

U.S. Cl. X.R.

260—514 R, 347.9; 423—540